June 28, 1966   N. I. BOHLIN   3,258,259
SEAT BACK REST WITH TENSIONING MEANS
Filed March 15, 1965   3 Sheets-Sheet 3

United States Patent Office 3,258,259
Patented June 28, 1966

3,258,259
SEAT BACKREST WITH TENSIONING MEANS
Nils Ivar Bohlin, Gothenburg, Sweden, assignor to Aktiebolaget Volvo, Gothenburg, Sweden, a corporation of Sweden
Filed Mar. 15, 1965, Ser. No. 439,912
Claims priority, application Sweden, July 14, 1964, 8,596/64
2 Claims. (Cl. 267—89)

This invention relates to an arrangement in seats, preferably seats to be used in vehicles, of the type in which the resilient structure of the back-rest consists of straps or a sheet of an elastic material, such as rubber or the like. The backrest is hollowed out such as in case of rolling motion of the vehicle to provide an effective lateral support for the person sitting on the seat, but an optimum support is not obtained unless the backrest is provided with a support member formed according to the small of the back of the person. However, one and the same form of the backrest does not fit all persons, which may cause pain, fatigue and other inconveniences when a person is sitting for a long time on a seat having an unfitting support for the small of the back. It has been suggested to solve this problem by placing loose support members on the front side of the backrest. Even other suggestions have been made, but they are so complicated and expensive that they have not been realized to a great extent.

The object of this invention is to provide a simple and reliable device for adjusting the support for the small of the back in seats of the kind referred to. In accordance with the invention there is provided a tightening device which is connected to a frame of the backrest and by means of which the tension on the straps or the sheet of the resilient structure in the region of the small of the back of the sitting person can be increased or decreased.

Figure 1:
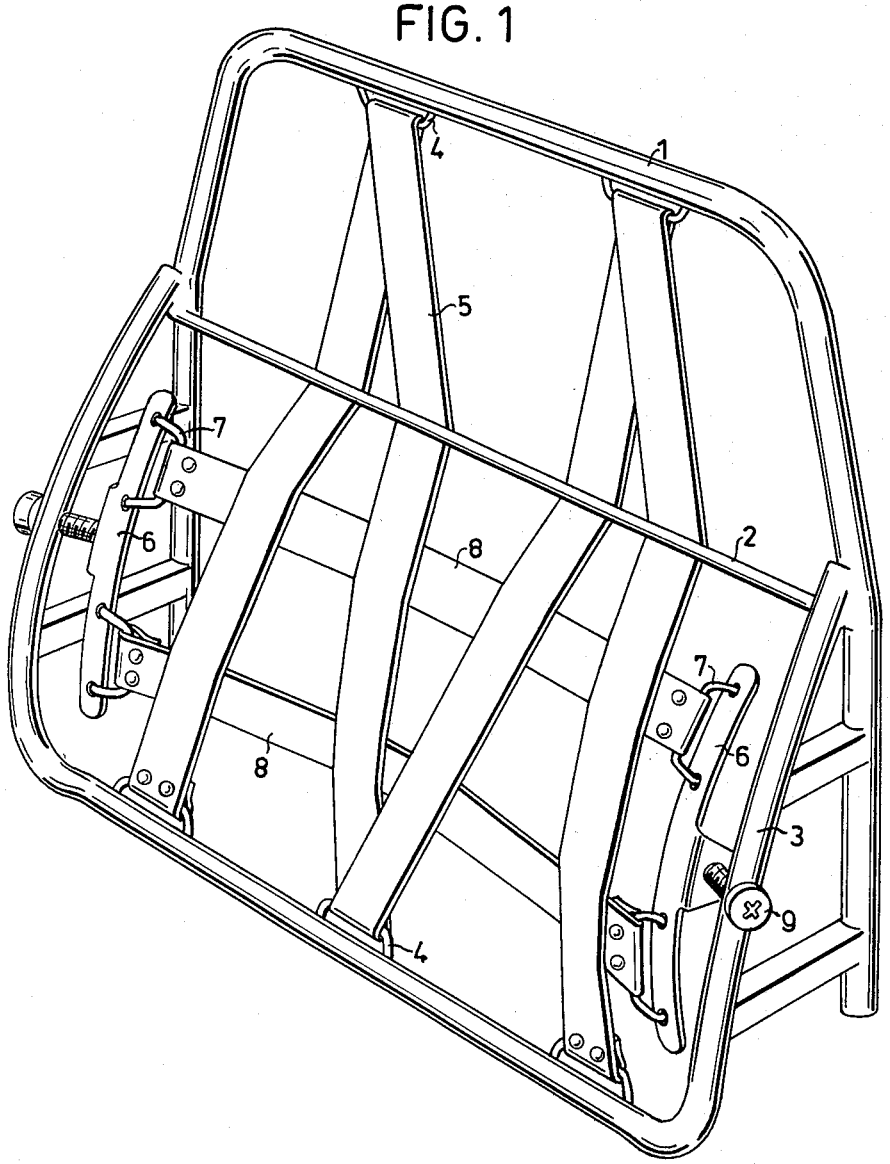
Figure 2:
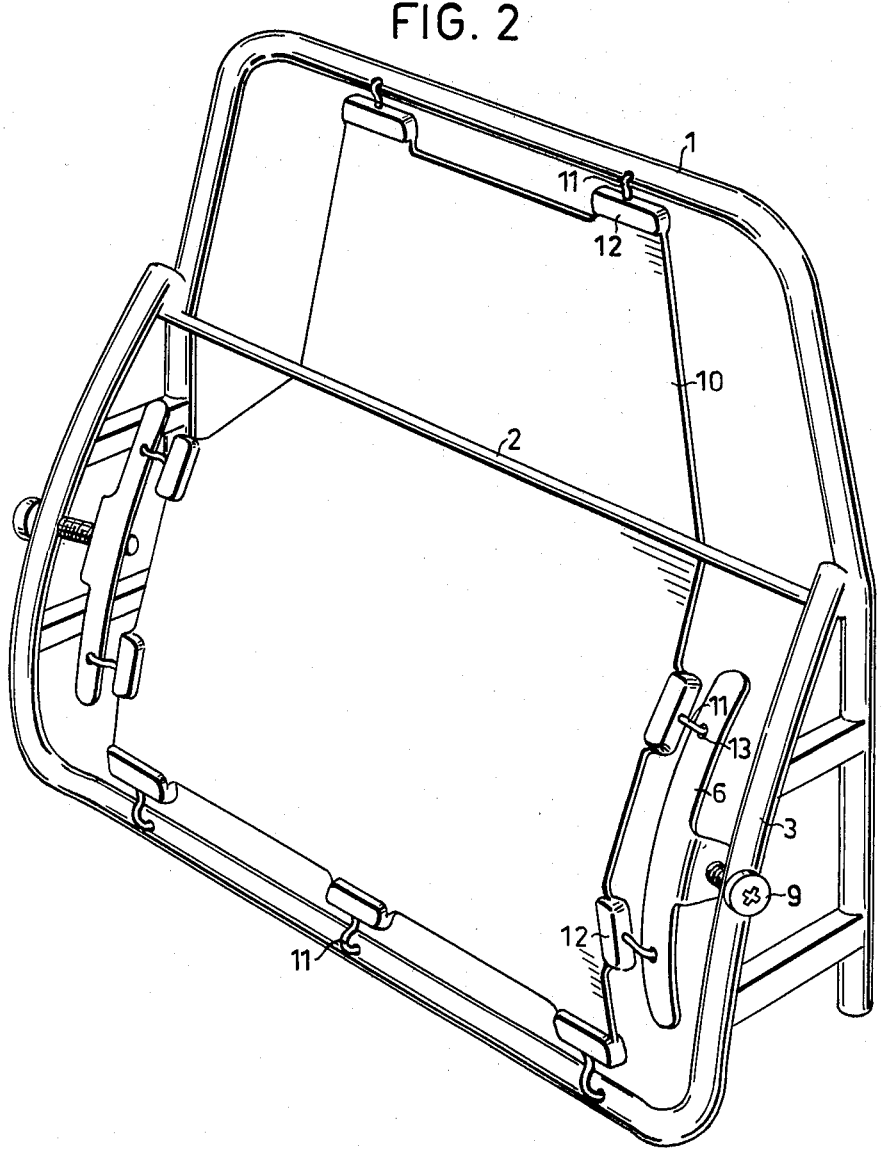
Figure 3:
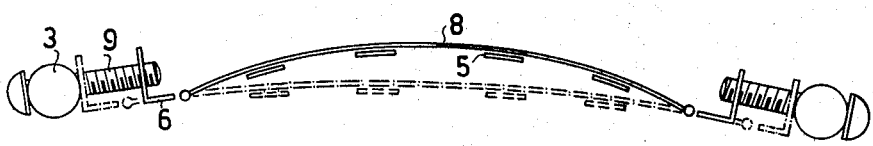
Figure 4:
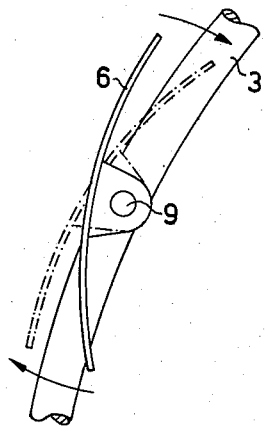

Two embodiments of the invention are described more closely with reference to the annexed drawings. FIG. 1 is a perspective view of a skeleton of a backrest in which the resilient structure consists of elastic straps. FIG. 2 is a corresponding view of a backrest provided with an elastic sheet. FIG. 3 is a plan view of the tightening device according to FIG. 1 in different adjusted positions, and FIG. 4 is a lateral elevation of the device shown in FIG. 3.

The skeleton of the backrest shown in FIG. 1 consists of a frame 1 which is composed of metal tubes and comprises a cross rod 2 which is secured between the side portions of the frame substantially on a level with the shoulder of the sitting person. Each side portion of the frame is in the form of a buck the front leg 3 of which is curved forwards. Secured to the upper and lower transverse portions of the frame 1 are buckles 4 through which an elastic strap 5 of rubber is passed in zigzag fashion up and down behind the rod 2. The strap 5 is part of the resilient structure of the backrest and the tension on the strap determines among other things the shape of the support for the small of the back. By increasing or decreasing the tension the support for the small of the back can be given an approximately plane form or permitted to became more yielding in accordance with the build of the sitting person. The tightening device consists of bars 6 or similar members each of which is connected to the front leg 3 of the side portion of the backrest on a level with the small of the back of the person. Each bar 6 extends substantially vertically along the backrest and is curved longitudinally substantially in conformity with the shape of the backrest in this region. Secured to the upper and lower ends of the bar 6 are buckles 7 for mounting elastic straps 8 which extend between the bars 6 provided near each side portion of the frame and are disposed on the rear side of the elastic strap 5 and together therewith constitute the resilient structure of the backrest. Mounted in the leg 3 of the frame 1 is an adjusting screw 9 which is screwed through a hole in the bar 6. Upon turning of the screw the bar 6 is moved toward or away from the side portion of the backrest so as to adjust the tension on the straps 8 and thereby to vary the tension of the resilient structure. Consequently, the support for the small of the back of the person just sitting on the seat can be given a suitable form or tension to obtain an appropriate resistance, as will be seen from the two conditions of tension indicated by full and dotted lines, respectively, in FIG. 3.

The bar 6 can also be turned about its horizontal adjusting screw 9 so that the support for the small of the back can assume an inclined position corresponding to the height above the seat of the small of the back of the sitting person.

The embodiment illustrated in FIG. 2 is distinguished from the embodiment shown in FIG. 1 by the fact that the resilient structure comprises an integral plate 10 of an elastic material which is secured at its upper and lower ends to the frame 1 by means of hooks 11 or similar members which advantageously are connected to the plate 10 by means of a reinforcing member 12. The bars 6 are directly connected to the plate 10 by means of similar reinforcing members 12 and hooks 11 which suitably are received in holes 13 in the bar 6.

This arrangement functions in the same manner as that shown in FIG. 1. This means that if the screw 9 is turned the tension on the plate 10 will be varied laterally in the region of the support for the small of the back so as to obtain the desired shape and resistance of this support.

The skeleton is of course upholstered in the usual manner and has a suitable covering.

The invention is not limited to the embodients illustrated, but includes such variations or modifications as will be realized by the man of the art and are comprised within the scope of the annexed claims. For instance, it is possible to provide the adjusting means (bar 6 and adjusting screw 9) for the support for the small of the back only at one side leg 3 of the frame 1 and to connect the straps 8 or the corresponding part of the plate 10 directly to the opposite leg of the frame 1. Further, the straps 8 in FIG. 1 may be replaced by more than two straps or by a single strap of suitable width.

What I claim is:
1. In a seat having a resilient backrest comprising a frame and elastic means in the form of straps or a sheet stretched in said frame, a tightening device connected to said frame and operable to adjust the tension on said elastic means in the region of the small of the back of a person sitting on the seat, said tightening device comprising a bar mounted near at least one side portion of the frame, and means for moving said bar transversely of the seat comprising a mounting member associated with said bar and a screw member mounted in said frame and cooperating with said mounting member and operable to be turned to adjust said tightening device.

2. A backrest as defined in claim 1 in which said bar is turnable about a substantially horizontal axis.

References Cited by the Examiner

UNITED STATES PATENTS

| | | | |
|---|---|---|---|
| 1,264,265 | 4/1918 | Brusius | 297—284 |
| 2,756,809 | 7/1956 | Endresen | 297—284 |
| 2,942,651 | 6/1960 | Binding | 297—284 |
| 3,095,188 | 6/1963 | Giese | 297—284 X |

FOREIGN PATENTS

| | | |
|---|---|---|
| 864,301 | 3/1961 | Great Britain. |
| 972,051 | 10/1964 | Great Britain. |

FRANCIS K. ZUGEL, *Acting Primary Examiner.*

CASMIR A. NUNBERG, *Examiner.*